US006672535B2

(12) United States Patent
Brunner, Jr. et al.

(10) Patent No.: US 6,672,535 B2
(45) Date of Patent: Jan. 6, 2004

(54) CAMERA SYSTEMS FOR TRACKING OBJECTS FROM AN AIRCRAFT

(75) Inventors: Joseph F. Brunner, Jr., Huntington Beach, CA (US); John C. Reineck, Ellicott City, MD (US)

(73) Assignee: Aerial View Systems, Inc., Newport Beach, CA (US)

( * ) Notice: Subject to any disclaimer, the term of this patent is extended or adjusted under 35 U.S.C. 154(b) by 0 days.

(21) Appl. No.: 10/131,453

(22) Filed: Apr. 22, 2002

(65) Prior Publication Data

US 2003/0213868 A1 Nov. 20, 2003

(51) Int. Cl.[7] .................................................. F41G 7/00
(52) U.S. Cl. ....................................... 244/3.16; 348/144
(58) Field of Search ................................ 244/1 R, 3.16, 244/3.17; 348/144; 396/7

(56) References Cited

U.S. PATENT DOCUMENTS 3,053,932 A * 9/1962 Worst ......................... 348/144
3,372,890 A * 3/1968 Bogard et al. ............. 244/3.17
3,725,576 A * 4/1973 Crawford et al. ........... 348/170
5,967,458 A * 10/1999 Williams et al. ........... 244/3.16

FOREIGN PATENT DOCUMENTS

EP 0 616 187 A1 * 9/1994 ............. F41G/7/22

* cited by examiner

*Primary Examiner*—Robert P. Swiatek
(74) *Attorney, Agent, or Firm*—Eric K. Satermo

(57) ABSTRACT

A camera system for tracking a target from an aircraft includes a camera with a moveable head, a user interface, and a control circuit. The target has target data indicative of a position of the target, and the aircraft includes a navigation system for generating aircraft data indicative of a current position of the aircraft. The user interface generates the target data, and the control circuit generates pointing data based on the aircraft data and the target data. The pointing data is provided to the camera to cause the camera to direct the camera head at the target. A video display within the aircraft may then display the images from the camera.

20 Claims, 8 Drawing Sheets

CAMERA SYSTEMS FOR TRACKING OBJECTS FROM AN AIRCRAFT

BACKGROUND OF THE INVENTION

1. Field of the Invention

The present invention relates to video cameras and, more specifically, to video cameras and associated hardware and methodology for tracking objects—either airborne or terrestrial—from an aircraft.

2. Description of the Related Art

It is often desirable to view the exterior of an aircraft during flight—both from a pilot's and a passenger's point of view. For example, a pilot may want to observe the landing gear prior to landing or an engine in flight. Alternatively, a passenger may want to look at a ground-based point of interest (e.g., a geological feature or a monument) during flight.

To satisfy these needs, cameras have been mounted on the exterior of aircraft, primarily private aircraft. These cameras are mounted in fixed locations on the aircraft and provide images of a fixed target. However, as these cameras are fixed, little flexibility in the viewing environment is afforded.

BRIEF SUMMARY OF THE INVENTION

A camera system for tracking a target from an aircraft includes a camera with a moveable head, a user interface, and a control circuit. The target has target data indicative of a position of the target, and the aircraft includes a navigation system for generating aircraft data indicative of a current position of the aircraft. The user interface generates the target data, and the control circuit generates pointing data based on the aircraft data and the target data. The pointing data is provided to the camera to cause the camera to direct the camera head at the target. A video display within the aircraft may then display the images from the camera. The user interface may provide a plurality of predetermined targets for selecting and tracking.

Other features and advantages of the present invention will become apparent to those skilled in the art from a consideration of the following detailed description taken in conjunction with the accompanying drawings.

DETAILED DESCRIPTION OF THE INVENTION

Figure 1A:
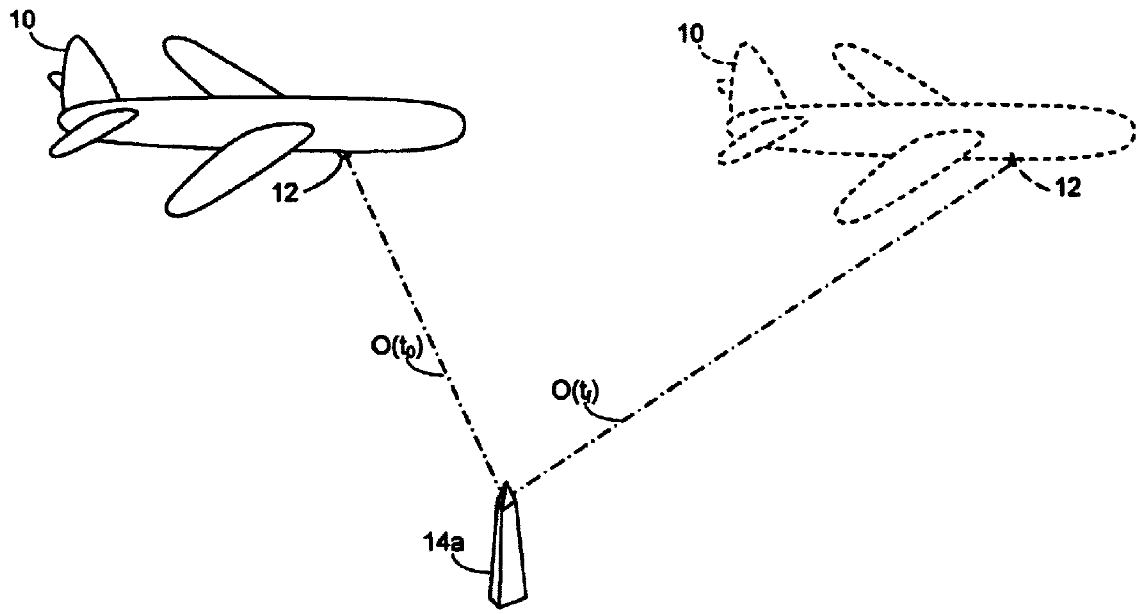
FIG. 1A illustrates an aircraft with a camera system tracking a stationary terrestrial target.
Figure 1B:
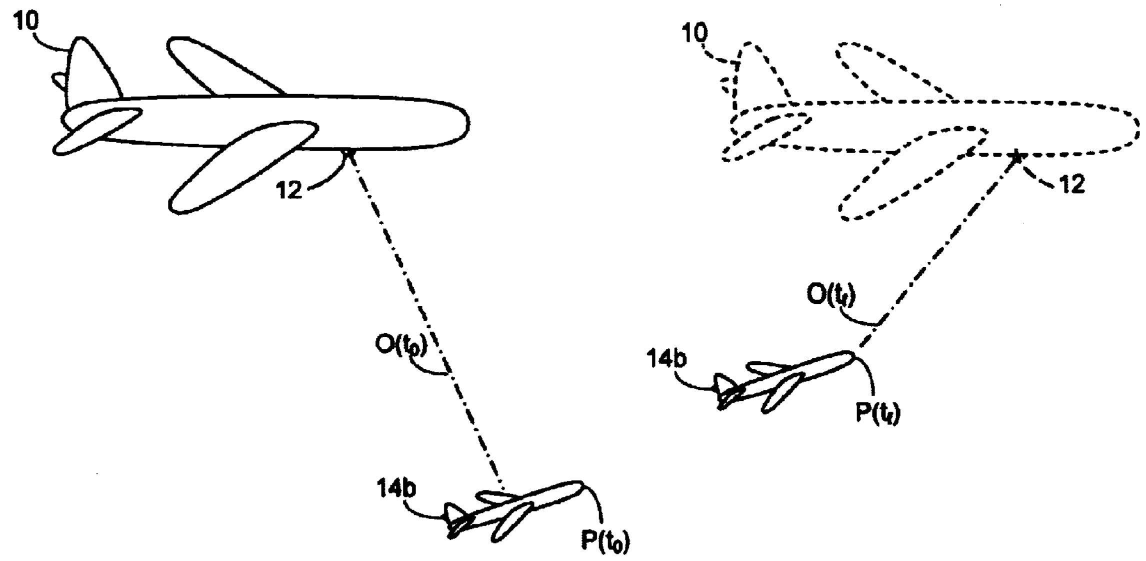
FIG. 1B illustrates an aircraft with a camera system tracking a dynamic airborne target.

Referring to the drawings in more detail, an aircraft 10 including a camera system 12 for tracking a target 14 is illustrated in FIG. 1. As represented in FIG. 1A, the camera system 12 may track a stationary ground-based or terrestrial target 14*a* continuously in real time from a current aircraft position, represented by optical axis $O(t_0)$, to a future aircraft position, represented by phantom line and optical axis $O(t_f)$. Alternatively, as represented in FIG. 1B, the camera system 12 may track a moving or dynamic target 14*b* continuously in real time from a current aircraft position and current target position $P(t_0)$ along a line of sight represented by optical axis $O(t_0)$, to a future aircraft position and future target position $P(t_f)$ along a line of sight represented by phantom line and optical axis $O(t_f)$. The dynamic target 14*b* may be airborne as shown in the drawing or may be a terrestrial moving target (now shown).

Figure 2:
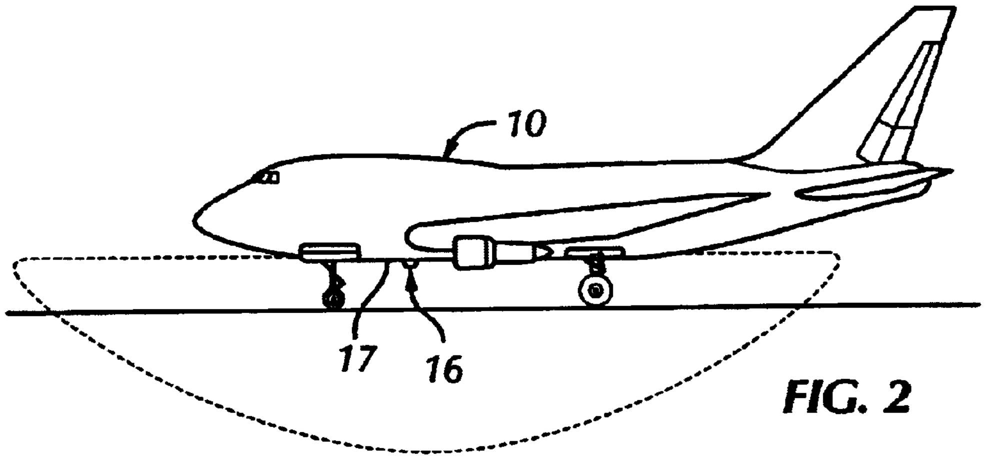
FIG. 2 illustrates a field of view in elevation of a camera system mounted to a belly of an aircraft.

Referencing FIG. 2, the camera system 12 is mounted on the aircraft 10 at a location that enables the tracking of a desired target. For ground-based targets, a camera module 16 of the camera system 12 may be mounted on an underside or belly 17 of the aircraft 10. For airborne targets, the camera module 16 may be mounted at other areas of the aircraft 10, e.g., on the nose or on the tail.

Figure 5:
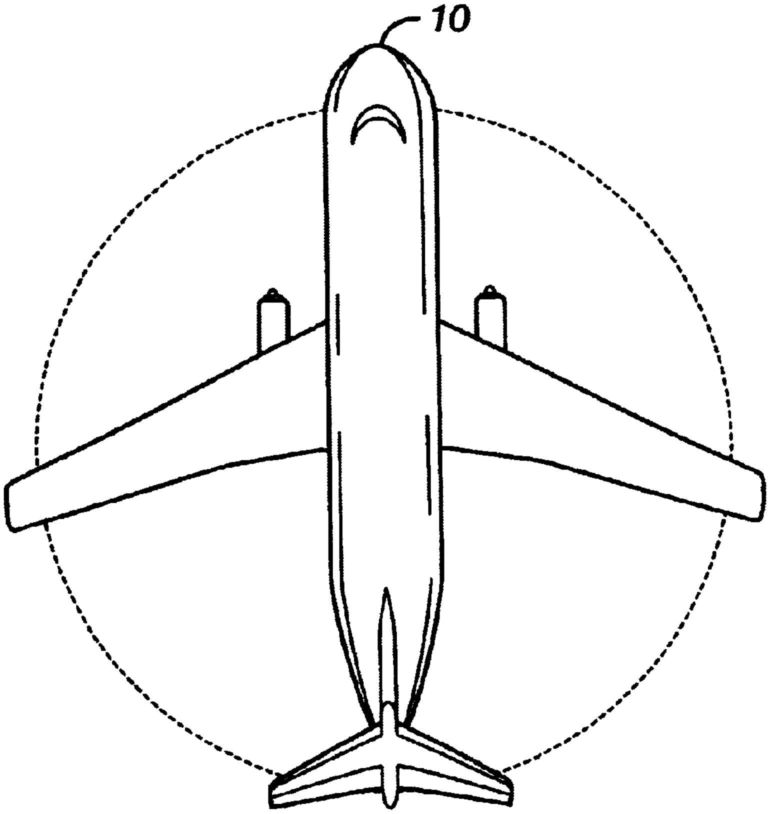
FIG. 5 illustrates a field of view in azimuth of a camera system mounted to a belly of an aircraft.
Figure 3A:
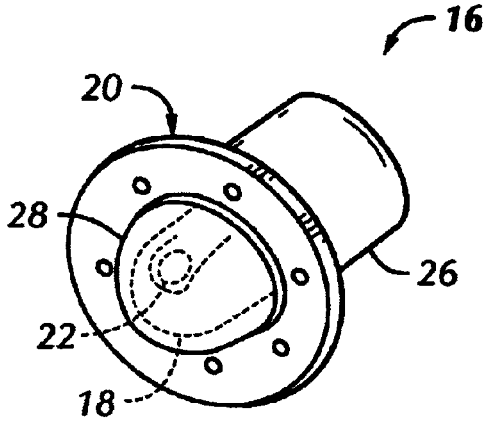
FIGS. 3A and 3B are perspective views taken from a front and a back, respectively, of a camera module of a camera system.
Figure 3B:
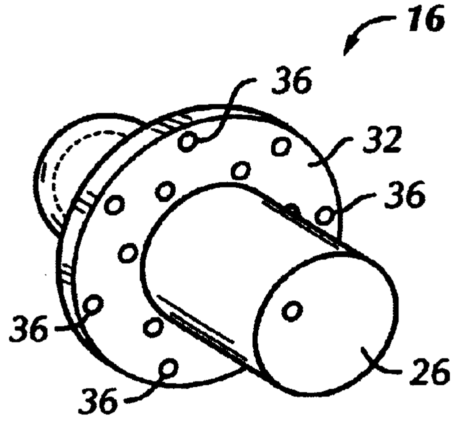
Figure 4:
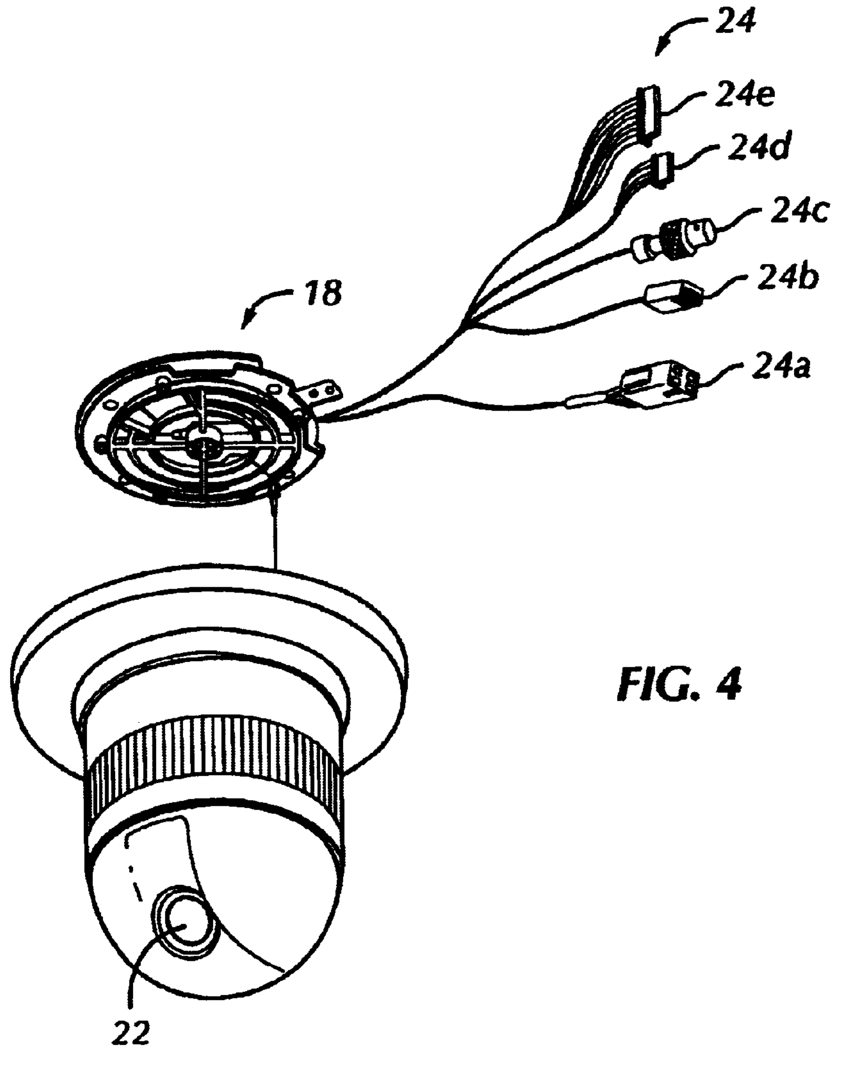
FIG. 4 is an exploded perspective view of a camera of a camera system for tracking targets.

With additional reference to FIGS. 3A and 3B, a camera module 16 of the camera system 12 may include a camera 18 disposed within a housing 20. According to one aspect of the invention as shown in FIG. 4, the camera 18 may include a Panasonic® Super Dynamic II color dome camera (model No. WV-CS854). This commercially available camera includes a camera head 22 and a plurality of connectors 24, including a power cable 24*a*, a data port 24*b*, a video output connector 24*c*, an alarm output connector 24*d*, and an alarm input connector 24*e*. The camera 18 is configured so that the camera head 22 is able to move approximately 180° along the elevation to provide a field of view as shown by the dashed lines in FIG. 2, and 360° along the azimuth to provide a field of view as shown by the dashed lines in FIG. 5. Other similarly capable cameras may be used.

The web site www.panasonic.com/CCTV/products/UnitizedDomeCameras.asp contains information on this camera. The entire content and associated linked web pages, include portable document format (PDF) files of associated specifications and operating manuals, of this site are incorporated herein by reference.

Figure 6:
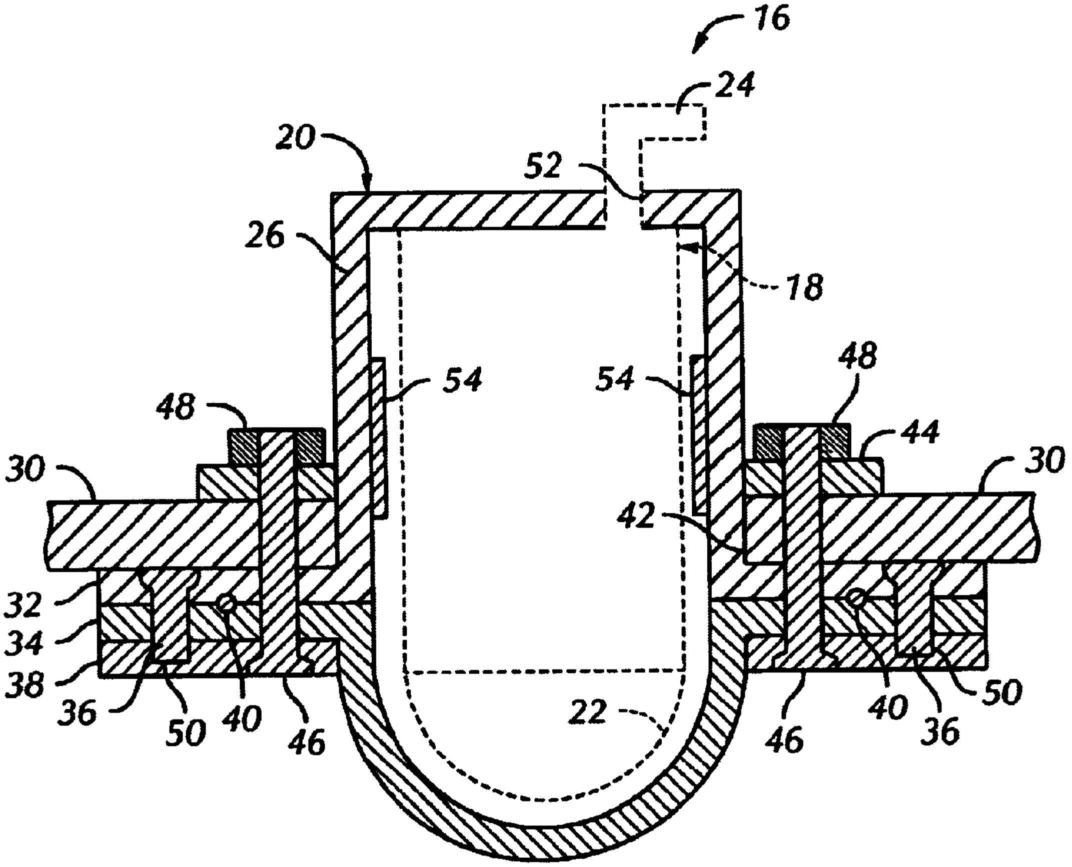
FIG. 6 is a cross-sectional view of a camera module mounted to an aircraft.

Referencing FIGS. 3 and 6, exemplary housing 20 may include a body 26 and a dome 28. When the camera 18 is received within the body 26, the camera head 22 extends out of the body 26 and into the dome 28. When mounted to an outer skin 30 of an aircraft, the dome 28 protrude beyond the skin 30, while the body 26 is located within the aircraft. The body 26 and the dome 28 may each include an annular flange 32 and 34, respectively. The dome 28 may be attached to the body 26 with a plurality of fasteners 36. An annular plate 38 may be provided such that the annular flange 34 of the dome 28 is sandwiched therebetween and the annular flange 32 of the body 26. In addition, a seal 40 such as an 0 ring or gasket may be disposed between flanges 32 and 34.

To mount the module 16 within the skin 30 of the aircraft 10, an opening 42 may be made in the skin 30 through which the body 26 may be inserted from the outside. An annular plate 44 (not shown in FIG. 3B) may then be positioned about the body 26 and against an inside surface of the skin 30. A plurality of fasteners 46 extending through holes in the exterior annular plate 38, the annular flange 34 of the dome 28, the annular flange 32 of the body 26, the skin 30, and the interior annular plate 44 may then secure the module 16 to the aircraft 10. Hardware associated with the fasteners 46, such as nuts 48 and washers, may be utilized.

According to one aspect of the camera module 16, the flanges 32 and 34 and the exterior annular plate 38 are configured so that the fasteners 36 extend outwardly, i.e., from the flange 32 of the body 26, through the flange 34 of the dome 28, to threaded tapped holes 50 of the exterior plate 38. Accordingly, when mounted to an aircraft, the fasteners 36 are not visible.

The camera module 16 may include a cable port 52 through which the cables 24 of the camera 18 are passable. For environmental integrity, the module 16 may be hermetically sealed, not only at the dome/body interface with the seal 40 but also at the cable port 52, e.g., with epoxy (not shown). In addition, the interior of the module 16 may be evacuated and/or nitrogen purged prior to sealing. A heater including one or more heating elements 54 may be disposed on an inside of the body 26 to maintain the temperature of the interior of the module 16 within an operating temperature range of the camera 18.

Figure 7:
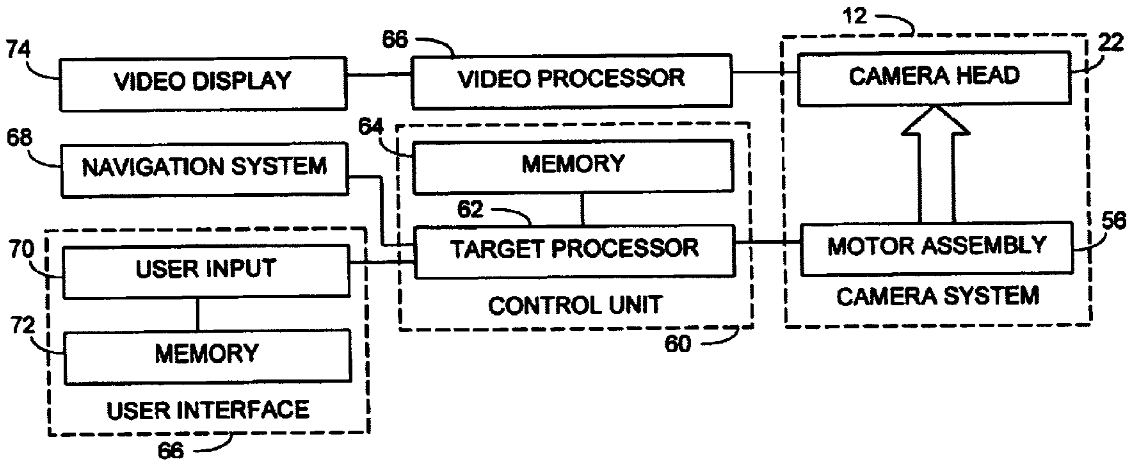
FIG. 7 is a block diagram illustrating the relationship of a camera system and associated hardware.
Figure 8:
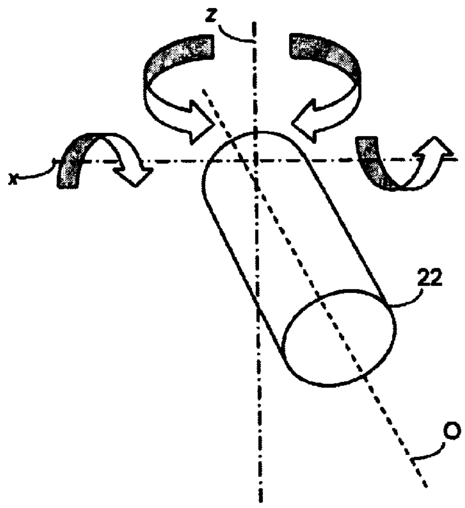
FIG. 8 illustrates a camera head rotating about two axes.

Referencing FIG. 7, in addition to the camera head 22, the camera system 12 may include a motor assembly 56. The camera head 22 may include any optical or solid-state recording device, e.g., a charge-coupled device (CCD). With additional reference to FIG. 8, to enable rotational movement about a vertical axis z and a horizontal axis x, the camera head 22 may be mounted in a pivotal harness. The motor assembly 56 may include a pair of motors for driving the camera head 22 in the harness.

With continued reference to FIG. 7, a control unit 60 for tracking targets in real time from an aircraft may include a target processor 62 and a memory 64. The target processor 62 may be connected to a user interface 66 and a navigational system 68 of the aircraft 10. Exemplary user interface 66 may include a user input 70, and may also include memory 72. Exemplary target processor 62 may then receive from the user interface 66 data associated with or indicative of a position of the target 14 (hereinafter "target data"). Similarly, the target-processing unit 62 may receive data associated with or indicative of a position of the aircraft 10 (hereinafter "aircraft data"). Upon processing the target and aircraft data, the target processor 62 may then transmit pointing data to the motor assembly 56 for directing the camera head 22 in a desired direction. According to the art, the camera head 22 may be connected to a video display 74 through a video processor 76 by the video output connector 24*c*.

Figure 9:
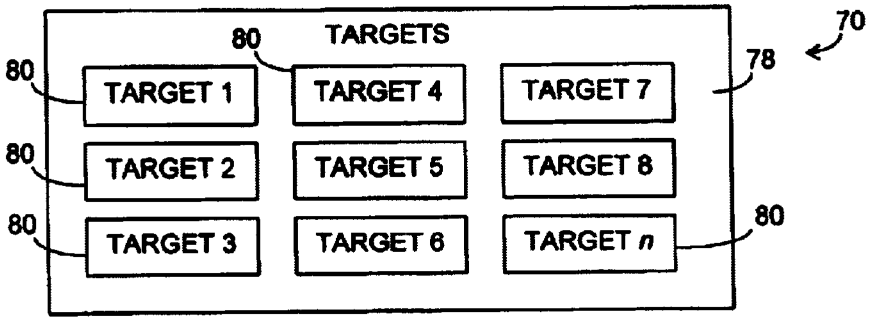
FIG. 9 illustrates an example of an input of a user interface.

An exemplary user input 70 of the user interface 36 is shown in FIG. 9. According to this example, the user input 70 may be configured as a touch screen display 78 with a plurality of target icons 80. Each of the icons 80 is associated with a target (i.e., TARGET 1, TARGET 2, TARGET 3, . . . , TARGET n), with each target having specific or unique target data, including latitude and longitude. In addition, the target data may include the altitude of the target. Examples of ground-based targets 14 associated with the icons 80 may include geographic features (e.g., mountains and lakes) and manmade points of interest (e.g., buildings, bridges, cities, etc.).

To select a target for tracking with the exemplary user input 70 with a touch screen display 78, a user selects and touches one of the target icons 80. The user interface 66 may be configured to generate target data associated with the selected target for transmission to the target processor 62. For example, the memory 72 may include a database or a look-up table including the target data for each of the predetermined target icons7; accordingly, the user input 70 may retrieve the target data from the memory 72 for transmission to the target processor 62. Alternatively, the user interface 66 may transmit a pointer associated with the selected target from the user input 70 to the target processor 62 which, in turn, retrieves the target data associated with the transmitted pointer from the memory 64.

Figure 10:
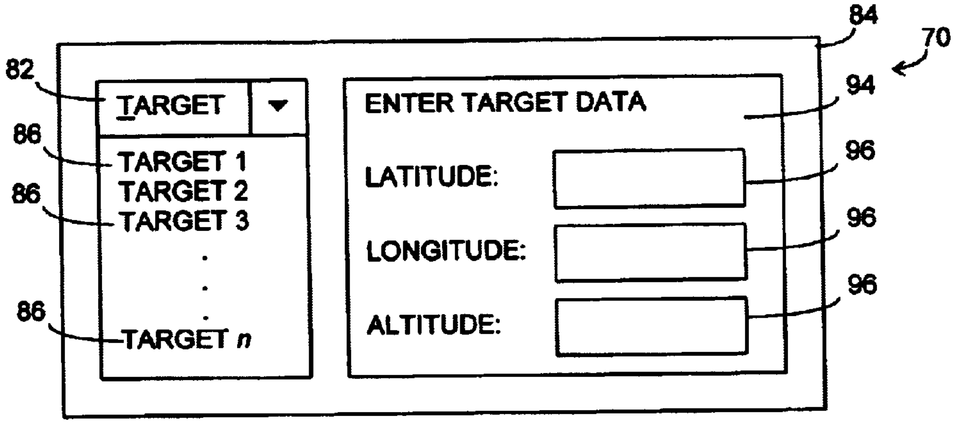
FIG. 10 illustrate another example of an input of a user interface.

Another example of a user input 70 is illustrated in FIG. 10 in which a pull-down menu 82 on a display 84 is provided. To select a target, a user activates the pull-down menu 82 and selects on of the displayed target icons 86. Upon selection, the user interface 66 may function analogously to that described above in relation to the touch-screen embodiment.

Figure 11:
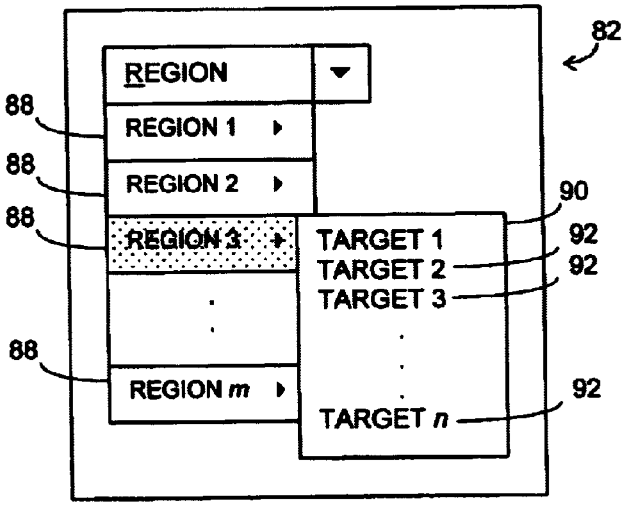
FIG. 11 illustrate an example of a pull-down menu for a user interface.

Referencing FIG. 11, the pull-down menu 82 may include one or more embedded call-out menus 88. When selected (e.g., the REGION 3 call-out menu 88 shown in FIG. 11), a supplemental menu 90 including a plurality of target icons 92 may be displayed. A user may then select one of the displayed target icons 92. In this example, each call-out menu 88 may include a number of target icons associated therewith. For example, if the call-out menus 88 are categorized according to region, then each of the target icons 92 associated therewith may be indigenous to the selected region. For example, if REGION 3 is California, then each of the target icons 92 may be targets located within that state. Alternatively, if the call-out menus 88 are categorized according to target type (not shown), then each of the target icons 92 associated therewith may be of a particular type of target.

As shown in FIG. 10, the user input 70 may include a user-enter target data box 94 having one or more target data fields 96, e.g., latitude, longitude, and altitude. Accordingly, a user may enter a set of target data for which tracking is desired.

Figure 12:
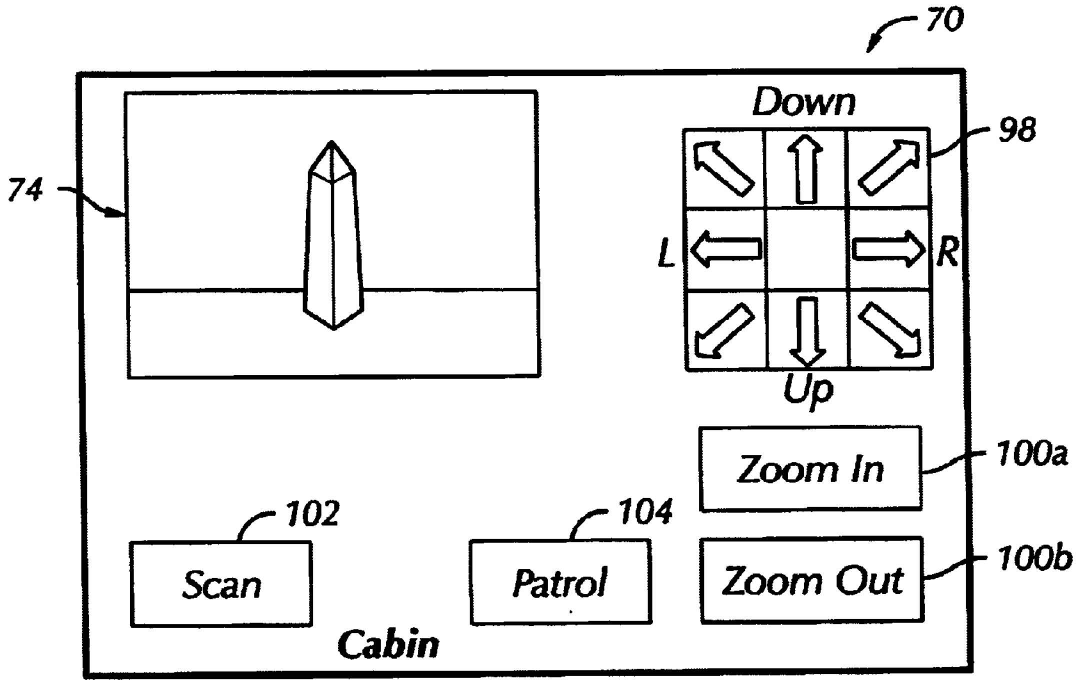
FIG. 12 illustrate an example of a cabin user interface.

Referencing FIG. 12, an exemplary embodiment of a user interface 70 may incorporate the video display 74 therein. In addition to preset target 80 discussed above, a user interface 70 may include a manual keypad 98 with directional buttons that, when actuated, direct the line of sight of the camera head 22 as desired. Zoom icons 100*a* (ZOOM IN) and 100*b* (ZOOM OUT) may be provided so that the zoom of the camera 12 may be manually controlled. A scan icon 102 may provide so that, when actuated, the camera head 22 scans through a predetermined set of target locations.

An exemplary embodiment of the user interface 70 may also include a patrol icon 104. For example, when an aircraft is parked on a tarmac, it may be desirable to view areas below the aircraft for security reasons. Accordingly, the patrol icon 104 may be actuated to cause the camera 12 to search preset sectors below the aircraft. In addition, the camera system 12 may include a motion detector (not shown) for detecting motion below the aircraft when the aircraft is stationary. If motion is detected near the aircraft, the camera system 12 may direct the camera head 22 to the moving object for tracking.

Figure 13:
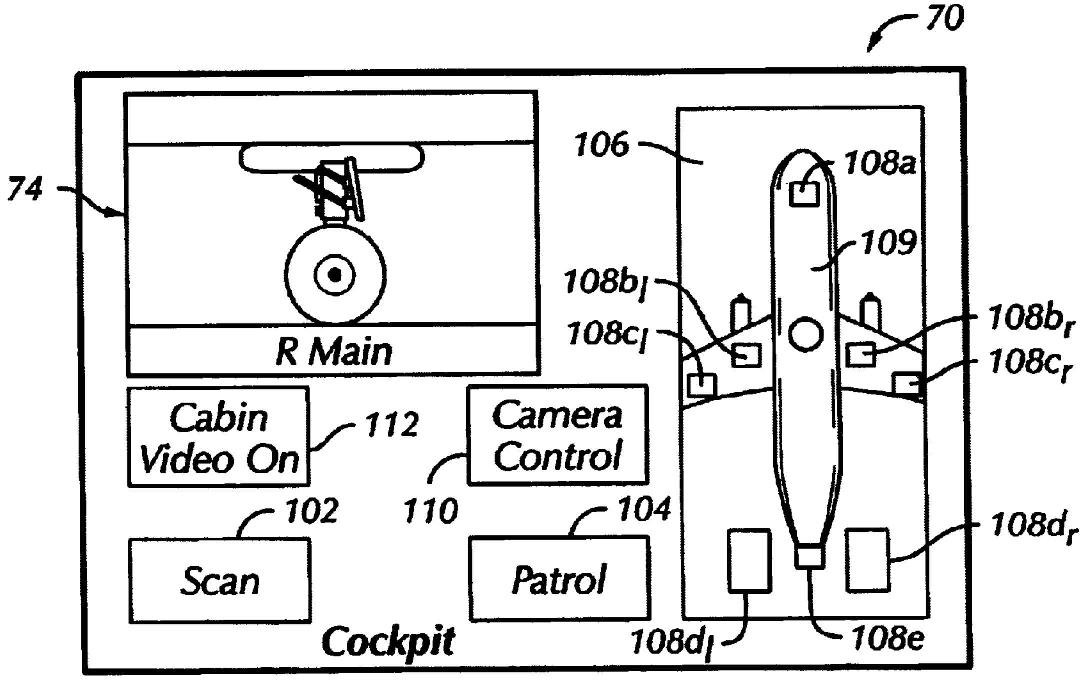
FIG. 13 illustrate an example of a cockpit user interface.

According to another aspect of the invention, a user interface 70 as shown in FIG. 13 may be configured specifically to meet pilot needs. More specifically, in contrast to the passenger-oriented user interface of FIG. 12, user interface 70 of FIG. 13 may include a preset location display 106 including one or more set-location icons 108 displayed on a graphic 109 of the aircraft 10. Each icon 108 may correspond to a particular location on the aircraft 10. As shown in the example, icon 108*a* corresponds to the nose of the aircraft 10; icon 108$b_R$, the right landing gear; icon 108$b_L$, the left landing gear; icon 108$c_R$, the right wing; icon 108$c_L$, the left wing; icon 108$d_R$, the right tail engine (if present); icon 108$d_R$, the left tail engine (if present); and icon 108*e*, the tail. Accordingly, when one of the icons 108 is actuated by a pilot (for example, by touching the icon on a touch screen), the camera head 22 is directed to the corresponding location, e.g., the right landing gear as shown on the video display in the example. Target data for each physical location corresponding to the preset icons 108 may be stored in memory of the system 12.

In addition to scan and patrol icons 102 and 104 as discussed above, exemplary cockpit user interface 70 of FIG. 13 may also include a camera control icon 110 for toggling control of the camera head 22 between a cabin user interface (if present) and the cockpit interface, and a cabin video icon 112. In a number of embodiments, a video camera may (not shown) be installed in the cabin of an aircraft. The output of this cabin camera may be viewed from the cockpit by actuating the cabin video icon 112.

Figure 14:
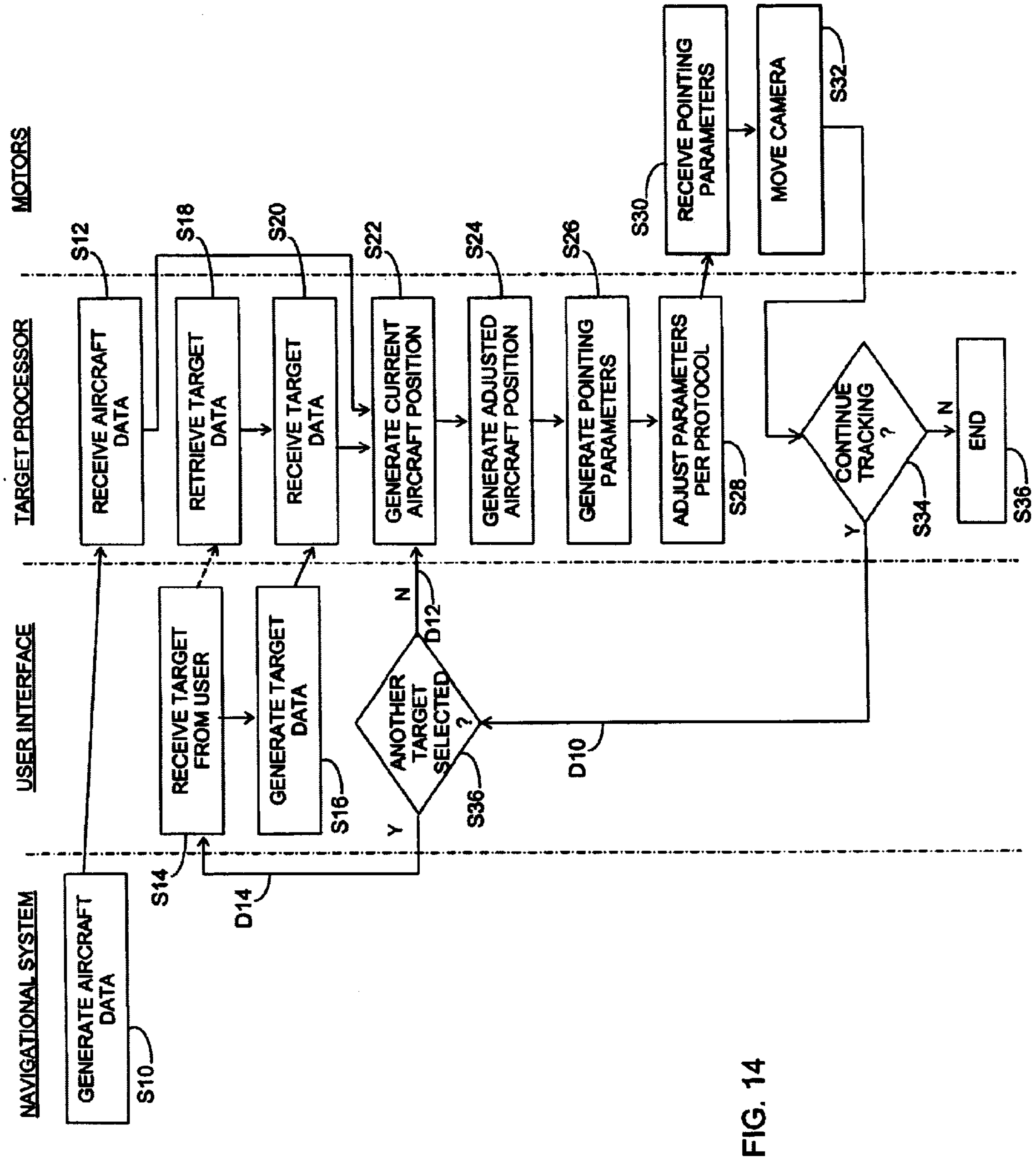
FIG. 14 illustrates exemplary methodology for tracking a target with a camera from an aircraft.

Exemplary methodology of the invention will be described with additional reference to FIG. 14. As mention, the navigation system 68 of the aircraft 10 generates aircraft data (step S10) which is transmitted to and received by the target processor 62 (step S12). The aircraft data may include latitude, longitude, altitude, pitch, roll, heading, and time.

As mentioned above, the user input 70 receives a desired target from a user (step S14) and may then generate (step S16) and transmit to the target processor 62 the target data associated therewith. In response, the target processor 62 may either retrieve the target data (step S18) from memory 64 or may retrieve the target data directly from the user interface 66 (step S20).

Once the aircraft and the target data are received, the target processor 62 may then generate the current position of the aircraft (step S22). This step may be performed if updates of the navigation position retrieved from the aircraft navigation system 68 are not as recent as desired, e.g., within a predetermined time frame. One example of carrying out this operation may include extrapolating data indicative of a previous aircraft position to the current time, e.g., the last navigation data retrieved to the current time using the last known velocity and heading of the aircraft. An example of a source code routine for carrying out this step is provided below.

Once the current position of the aircraft 10 is determined, the target processor 62 may then generate an adjusted aircraft position (step S24). To do so, the latitude and longitude parameters of the aircraft position in current time are adjusted based on the pitch, roll, and heading parameters of the aircraft data. An example of a source code routine for carrying out this step is provided below.

Based on the adjusted latitude and longitude of the aircraft, the pointing parameters for the camera head 22 may be generated (step S26). The pointing parameters may include an azimuth parameter and an elevation parameter. The pointing parameters are based on the adjusted latitude and longitude of the aircraft and the known latitude and longitude of the target 14. An example of a source code routine for carrying out this step is provided below.

The target processor 62 may then modify the pointing parameters to complement a protocol of the motor assembly 56 (step S28). For example, the processor 62 may translate the two pointing parameters (i.e., azimuth and elevation) into a format that is understandable to the motor assembly 56 of the camera 12. Upon receipt of the pointing parameters (step S30), the motor assembly 56 may move the camera head 22 accordingly (step S32) to maintain the target 14 along the optical axis 0 of the camera.

The tracking process may be continuous (step S34) or end (step S36) at any time. If it is desired to continue tracking (decision D10), particularly the same target 14 (decision D12), then the target processor 62 continuously receives new aircraft data from the navigational system 68, while the target data remains constant. If it is desired to track a different target (step S34 and decision D14), then the user cause the user interface 66 to generate target data for another desired target.

EXAMPLE I

Source Code Routine for Step S24—Generate Adjust Aircraft Position

```
' Compute_Az_E1
' This routine accepts the aircraft data and target data as inputs.
' The aircraft data is adjusted for pitch, roll, and heading.
' The pan and tilt angles are computed between the adjusted aircraft position and the target.
' Inputs
'       Alt         Aircraft Altitude in feet
'       Lat         Aircraft Latitude in degrees decimal
'       Lon         Aircraft Longitude in degrees decimal
'       Pitch       Aircraft pitch in degrees
'       Roll        Aircraft Roll in degrees
'       Hdg         Aircraft Hdg in degrees decimal
'       tgt_alt     Target Altitude in feet
'       tgt_lat     Target Latitude in degrees decimal
'       tgt_lon     Target longitude in degrees decimal
' Outputs
'       pan_angle   The angle the camera needs to rotate to point to target in degrees
'       tilt_angle  The depression angle the camera need to point to target in degrees
```

-continued

```
' Public Sub Compute__Az__E1(Alt AS Single, __
                            Lat As Double, __
                            Lon As Double, __
                            Pitch As Double, __
                            Roll As Double, __
                            Hdg As Double, __
                            tgt__alt As Double, __
                            tgt__lat As Double, __
                            tgt__lon As Double)
Dim new__alt As Double
Dim new__lon As Double
Dim new__lat As Double
' The position of the target and aircraft are described in three dinensions (alt, lat, lon)
' If the aircraft is at 0 degrees heading, 0 degrees pitch, and 0 degrees roll
' the coordinate systems of the aircraft and target remain the same and simple geometry can be
' used to calculate the pan and tilt angles needed by the camera to point to the target.
' But as the aircraft changes pitch, roll, and heading, the coordinate systems begin to differ,
' and simple geometry no longer applies. This routine goes through several steps to adjust the
' aircraft coordinate system back to being the same as that of the target so that simple geometry
' can be used to calculate the pan and tilt angles of the camera.
' STEP 1. In this method we subtract the target position from the platform and target positions,
' thus making the target (0,0,0), and the platform offset from there.
' Subtract the target coordinates from the platform coordinates:
new__alt = Alt - tgt__alt
new__lat = Lat - tgt__lat
new__lon = Lon - tgt__lon
' Convert all coordinates to meters:
Const Radius = 6378007 ' radius of Earth in meters
Const pi = 3.141592
Const Circumference = Radius * 2 * pi
Const metersPerLatDD = 111113.519
Const DegToRad = pi / 180
lon__to__meters = (Cos(Lat * (pi / 180)) * Circumference) / 360
lat__To__meters = 111113.519
new__alt = new__alt * 0.3048 ' convert from feet to meters
new__lat = new__lat * lat__To__meters
new__lon = new__lon * lon__to__meters
' convert degrees to radians
Hdg = Hdg * DegToRad
' Roll to rightwing up is positive
Roll = Roll * DegToRad
Pitch = Pitch * DegToRad
' The transformation equations assume counter clockwise is positive
' Therefore pitch must be negated
' Positive Pitch is modeled by a clockwise rotation
Pitch = −Pitch
' STEP 2. The rotation equations for hdg, pitch, and roll are applied.
' Rotate for heading
' new__alt = Z, new__lat = Y, new__lon = X
z = new__alt
Y = new__lat
X = new__lon
new__lon = X * Cos(Hdg) − Y * Sin(Hdg)
new__alt = z
new__lat = X * Sin(Hdg) + Y * Cos(Hdg)
' Rotate for pitch
z = new__alt
Y = new__lat
X = new__lon
new__lon = X
new__alt = z * Cos(Pitch) + Y * Sin(Pitch)
new__lat = −(z * Sin(Pitch)) + Y * Cos(Pitch)
' Rotate for Roll
z = new__alt
Y = new__lat
X = new__lon
new__lon = X * Cos(Roll) + z * Sin(Roll)
new__alt = −(X * Sin(Roll)) + z * Cos(Roll)
new__lat = Y
' new__lat, new__lon, new__alt now represent the adjusted aircraft position coordinates
' STEP 3. The azimuth and elevation of the camera to point at the target [now (0,0,0)] are
computed: compute az, el of new point to the target
pan__angle = Compute__Az(new__lon, new__lat)
tilt__angle = Compute__El(new__alt, new__lon, new__lat)
MsgBox "Az" & pan__angle
MsgBox "El" & tilt__angle
End Sub
```

EXAMPLE II

Source Code Routine for Step S26—Generate Pointing Parameters (Azimuth and Elevation)

```
' Compute_Az
  Public Function Compute_Az(ddx1 As Double, _
                        ddy1 As Double) As Single
' Compute the Azimuth (in degrees from north) or left/right pointing angle required to point the
camera to the ' target
Dim opposite As Double, adjacent As Double
Dim pi As Double
Dim Ratio As Double
Dim Angle As Double
Dim Degrees As Double
Dim calcAngle As Double
     pi = 4 * Atn(1)
     ' Longitude difference between sircraft and target
     opposite = Abs(ddx1)
     ' Latitude difference between aircraft and target
     adjacent = Abs(ddy1)
     If adjacent = 0 Then
          Compute_Az = 0
          Exit Function
     End If
     ' Arc Tangent of opposite over adjacent gives the angle between the
     ' aircraft and target
     Ratio = opposite / adjacent
     Angle = Atn(Ratio)
     Degrees = Angle * 180 / pi
          ' Adjust angle for quadrant it resides in
          If 0 > ddx1 And 0 < ddy1 Then
               calcAngle = 90 - Degrees + 90
          ElseIf 0 < ddx1 And 0 < ddy1 Then
               calcAngle = Degrees + 180
          ElseIf 0 < ddx1 And 0 > ddy1 Then
               calcAngle = 90 - Degrees + 270
          Else
               calcAngle = Degrees
          End If
     Compute_Az = calcAngle
End Function
' Compute EL
Public Function Compute_E1(Alt As Double, _
                         ddx1 As Double, _
                         ddy1 As Double) As Double
     Dim distance As Double
     Const pi = 3.141592
' Compute the elevation or downward pointing angle needed to point to the target
     ' These are two sides of a right triangle, opp/adj gives angle
     If Alt = 0 Then
          Compute_E1 = 0
     Else
          ' Compute distance on ground from aircraft position to target
          distance = Sqr(ddx1 ^ 2 + ddy1 ^ 2)
          ' Elevation angle of camera = ARC Tangent of distance on ground to
          ' elevation above target.
          Compute_E1 = (90 - (Atn(distance / Alt) * (180 / pi)))
     End If
End Punction
```

The invention is not limited to the exemplary embodiments described above but is, instead, to be construed according to the claims that follow.

What is claimed is:

1. A camera system for tracking a target from an aircraft, the target having target data indicative of a position of the target, the aircraft including a navigation system for generating aircraft data indicative of a current position of the aircraft, the system comprising:

a camera with a movable camera head;

a user interface for generating the target data; and a control circuit for communicating with the navigation system, the user interface, and the camera and for generating pointing data based on the aircraft data and the target data;

the pointing data for causing the camera to direct the camera head at the target; and the camera for receiving the pointing data from the control circuit and for moving the camera head accordingly.

2. A camera system as claimed in claim 1 wherein the user interface includes a plurality of target icons each corresponding to a target with respective target data;

the user interface for providing the target data to the control circuit when one of the target icons is actuated.

3. A camera system as claimed in claim 1 further comprising memory for storing target data for a plurality of targets.

4. A camera system as claimed in claim 3 wherein the user interface provides the target data for one of the plurality of targets to the control circuit.

5. A camera system as claimed in claim 1 further comprising a video display in communication with the camera.

6. A camera system as claimed in claim 1 wherein the user interface includes a video display in communication with the camera.

7. A camera system as claimed in claim 6 wherein the user interface further includes a memory for storing target data for a plurality of targets.

8. A camera system as claimed in claim 6 wherein the user interface further includes a memory for storing target data for a plurality of locations on the aircraft.

9. A camera system for tracking a target from an aircraft, the target having target data indicative of a position of the target, the aircraft including a navigation system for generating aircraft data indicative of a current position of the aircraft, the system comprising:

a camera with a movable camera head;

a user interface for generating the target data; and a control circuit for communicating with the navigation system, the user interface, and the camera and for generating pointing data based on the aircraft data and the target data;

the pointing data for causing the camera to direct the camera head at the target; and the camera for receiving the pointing data from the control circuit and for moving the camera head accordingly;

wherein the user interface includes:

a video display in communication with the camera;

a memory for storing target data for a plurality of targets; and a scan icon for selecting one of the plurality of targets; the user interface for generating the target data when the scan icon is actuated to select one of the targets.

10. A camera system for tracking a target from an aircraft, the target having target data indicative of a position of the target, the aircraft including a navigation system for generating aircraft data indicative of a current position of the aircraft, the aircraft having a plurality of locations thereon, the system comprising:

a camera with a movable camera head;

a user interface for generating the target data, and a control circuit for communicating with the navigation system, the user interface, and the camera and for generating pointing data based on the aircraft data and the target data;

the pointing data for causing the camera to direct the camera head at the target; and the camera for receiving the pointing data from the control circuit and for moving the camera head accordingly;

wherein the user interface includes:

a video display in communication with the camera;

a memory for storing target data for a plurality of targets; and a plurality of set-location icons each corresponding to one of the locations on the aircraft and for selecting one of the locations on the aircraft;

the user interface for generating the target data when one of the set-location icons is actuated.

11. A camera system as claimed in claim 10 wherein the user interface further includes a preset location display in which the set-location icons are located.

12. A camera system as claimed in claim 11 wherein the present location display includes a graphic of the aircraft;

each of the set-location icons being located on the graphic at a position corresponding to the target data thereof.

13. A camera module for mounting to a skin of an aircraft, the camera module comprising:

a camera including a movable camera head;

a housing including a body and a dome each having an annular flange for mating with each other, the housing for receiving the camera such that the camera head is disposed within the dome;

an annular plate for being received about the dome and for mating with the annular flange of the dome such that the annular flange of the dome is disposed between the annular flange of the body and the annular plate; and the annular flange of the body including a plurality of through holes and the annular flange of the dome including a plurality of through holes for aligning with the through holes of the annular flange of the body when mated;

the annular plate including a plurality of tapped holes for aligning with the through holes of the annular flange of the dome when mated; and a plurality of fasteners each respectively for extending through one of the through holes of the annular flange of the body and through one of the through holes of the annular flange of the dome and for mating with one of the tapped holes of the annular plate.

14. A camera module as claimed in claim 13 further comprising a seal disposed between the annular flanges.

15. A camera module as claimed in claim 13 wherein the housing is hermetically sealed.

16. A camera module as claimed in claim 13 further comprising a heating element disposed on an inside of the body.

17. A method for tracking a target with a camera on an aircraft, the aircraft including a user interface for generating target data indicative of a position of the target, and a navigation system for generating aircraft data indicative of a current position of the aircraft in real time, the camera including a movable head, the method comprising:

receiving the target data from the user interface;

receiving the aircraft data from the navigation system;

generating pointing data based on the aircraft data and the target data; and providing the pointing data to the camera for moving the camera head accordingly.

18. A method as claimed in claim 17 further comprising generating the target data.

19. A method as claimed in claim 18 wherein the step of generating the target data includes selecting with the user interface a target from a plurality of predetermined targets each with respective target data.

20. A method as claimed in claim 17 further comprising repeating the steps of receiving the navigational data, generating pointing data, and providing the pointing data.

* * * * *